(12) United States Patent
Strzelczyk et al.

(10) Patent No.: US 9,514,336 B2
(45) Date of Patent: Dec. 6, 2016

(54) METHOD AND SYSTEM FOR ADAPTIVE OPERATION OF A POWER AMPLIFIER OF A RADIO FREQUENCY IDENTIFICATION (RFID) READER DEVICE

(75) Inventors: Martin J. Strzelczyk, New Market, MD (US); Sean A. Connolly, Stony Brook, NY (US); Mark W. Duron, East Patchogue, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 1529 days.

(21) Appl. No.: 12/640,840

(22) Filed: Dec. 17, 2009

(65) Prior Publication Data

US 2011/0148579 A1    Jun. 23, 2011

(51) Int. Cl.
G08B 21/00 (2006.01)
G06K 7/00 (2006.01)
G06K 7/10 (2006.01)

(52) U.S. Cl.
CPC ......... G06K 7/0008 (2013.01); G06K 7/10217 (2013.01); H04Q 2213/13095 (2013.01)

(58) Field of Classification Search
USPC .................... 340/10.1–10.6, 572.1–572.9; 235/375–385
See application file for complete search history.

(56) References Cited

U.S. PATENT DOCUMENTS

| | | | |
|---|---|---|---|
| 6,029,051 A * | 2/2000 | Osterberg et al. | 455/115.1 |
| 6,126,070 A * | 10/2000 | Fukuzumi | 235/380 |
| 6,456,093 B1 * | 9/2002 | Merkel et al. | 324/640 |
| 6,489,679 B2 * | 12/2002 | Tsukiyama et al. | 257/728 |
| 6,591,531 B1 * | 7/2003 | Wiebe | 42/70.11 |
| 6,594,508 B1 * | 7/2003 | Ketonen | 455/561 |
| 6,643,497 B1 * | 11/2003 | Kouyama | 455/83 |
| 6,748,433 B1 * | 6/2004 | Yaakov | 709/224 |
| 6,838,989 B1 * | 1/2005 | Mays et al. | 340/572.1 |
| 6,973,287 B2 * | 12/2005 | Franzen et al. | 455/12.1 |
| 7,043,269 B2 * | 5/2006 | Ono et al. | 455/558 |
| 7,095,221 B2 * | 8/2006 | Bosselmann et al. | 324/71.1 |
| 7,372,410 B2 * | 5/2008 | Hori | 343/700 MS |
| 7,385,477 B2 * | 6/2008 | O'Toole et al. | 340/10.2 |
| 7,545,256 B2 * | 6/2009 | O'Toole et al. | 340/10.2 |
| 7,812,769 B2 * | 10/2010 | Mizuno et al. | 343/700 MS |
| 8,013,715 B2 * | 9/2011 | Chiu et al. | 340/10.3 |
| 2001/0004129 A1 * | 6/2001 | Tsukiyama et al. | 257/684 |
| 2003/0064683 A1 * | 4/2003 | Matthews et al. | 455/67.1 |
| 2003/0134592 A1 * | 7/2003 | Franzen et al. | 455/12.1 |
| 2005/0264275 A1 * | 12/2005 | Bosselmann et al. | 324/71.1 |
| 2006/0208948 A1 * | 9/2006 | Hori | 343/700 MS |
| 2008/0042838 A1 * | 2/2008 | Levin et al. | 340/572.1 |
| 2009/0002131 A1 * | 1/2009 | Chiu et al. | 340/10.4 |
| 2009/0146784 A1 | 6/2009 | Soleimani et al. | |
| 2010/0109848 A1 * | 5/2010 | Blair et al. | 340/10.2 |
| 2010/0117919 A1 * | 5/2010 | Mizuno et al. | 343/846 |
| 2010/0207786 A1 * | 8/2010 | Chen et al. | 340/903 |
| 2010/0245055 A1 * | 9/2010 | Freeman et al. | 340/10.41 |
| 2010/0301118 A1 * | 12/2010 | Duron | 235/439 |

(Continued)

Primary Examiner — Mark Rushing

(57) ABSTRACT

A method and system for adaptive operation of a power amplifier of an RFID reader device enables more efficient power management of the reader device. The method includes transmitting an RF interrogation signal from an antenna of the RFID reader device (step 505). A reflected signal is then received as a partial reflection of the interrogation signal (step 510). A return loss value is then estimated by comparing at least one parameter of the interrogation signal and at least one parameter of the reflected signal (step 515). Finally, an operating point of the power amplifier is adjusted in response to the return loss value (step 520).

14 Claims, 3 Drawing Sheets

(56) References Cited

U.S. PATENT DOCUMENTS

2011/0004276 A1\* 1/2011 Blair et al. .................. 607/60
2011/0148579 A1\* 6/2011 Strzelczyk et al. .......... 340/10.1
2011/0176060 A1\* 7/2011 Lee et al. ...................... 348/723
2011/0266342 A1\* 11/2011 Forster .......................... 235/385

\* cited by examiner

METHOD AND SYSTEM FOR ADAPTIVE OPERATION OF A POWER AMPLIFIER OF A RADIO FREQUENCY IDENTIFICATION (RFID) READER DEVICE

FIELD OF THE DISCLOSURE

The present invention relates generally to radio frequency identification (RFID) reader devices, and in particular to improving the operating stability and efficiency of an RFID reader device.

BACKGROUND

RFID tags are now widely used to mark, inventory and track various products. RFID tags generally transmit to a handheld or robotically controlled reader device a radio frequency (RF) signal that includes product information. RFID tags generally include an integrated circuit for storing and processing information, a transceiver for transmitting and receiving RF signals, and an antenna. Some RFID tags are active RFID tags and include their own battery power source. Passive RFID tags do not have their own power source and require receiving a power signal from a reader device to operate. For interrogating passive RFID tags, a reader generally transmits a continuous wave (CW) or modulated RF signal to a tag. The tag receives the signal, and responds by modulating the signal and then "backscattering" an information response signal to the reader. The reader device receives the response signal from the tag, and the response signal is demodulated, decoded and further processed.

The receiver of a reader device employs a directional device to separate the incoming backscatter from the outgoing CW energy; however, any energy reflected back from an antenna of the reader device is summed with incoming backscatter signals. Cabling and RF-reflective objects in front of an antenna can also cause such reflected energy. Increasing a bias point (also known as an operating point) of an RF power amplifier of a reader device will generally increase a return loss value and increase an operating range of the amplifier. A bias point is therefore generally preset to a fixed value to accommodate an estimated worst-case return loss value.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
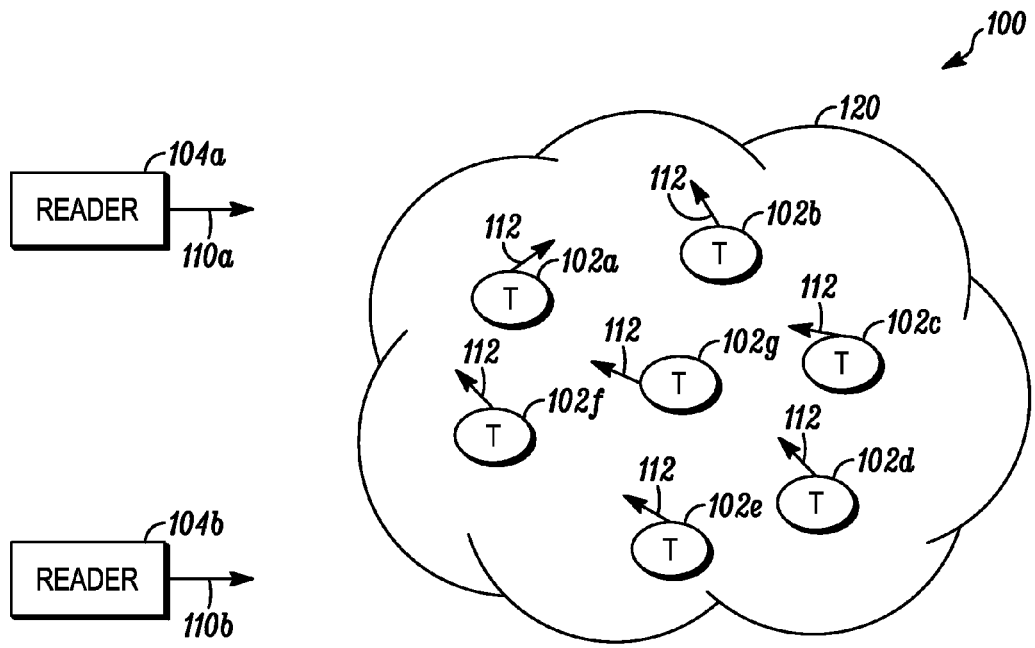
FIG. 1 is a system diagram illustrating an environment where RFID reader devices communicate with an exemplary population of RFID tags, according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, a method is provided for adaptive operation of a power amplifier of an RFID reader device. The method includes transmitting an RF interrogation signal from an antenna of the RFID reader device. A reflected signal is then received as a partial reflection of the interrogation signal. A return loss value is then estimated by comparing at least one parameter of the interrogation signal and at least one parameter of the reflected signal. Finally, an operating point of the power amplifier is adjusted in response to the return loss value.

Embodiments of the present invention thus enable an RFID reader device to adjust in real time the operating point of an RF power amplifier of the device to improve both the overall stability and energy efficiency of the device. In the presence of a high return loss value, and thus effective antenna impedance matching, the operating point can be decreased in real time to reduce energy consumption while still providing undistorted modulated transmissions. Similarly, in the presence of a low return loss value, and thus less effective antenna impedance matching, the operating point can be increased in real time to stabilize the system. Thus, with battery powered RFID reader devices, embodiments of the present invention can extend battery life with little or no sacrifice in performance.

Before describing embodiments of the present invention in detail, it is helpful to describe an example RFID communications environment in which the invention may be implemented. FIG. 1 is a system diagram illustrating an environment 100 where RFID reader devices 104 communicate with an exemplary population 120 of RFID tags 102. As shown, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network.

As shown in FIG. 1, reader 104a transmits an interrogation signal 110 having a carrier frequency to the population of tags 120. Reader 104b transmits an interrogation signal 110b having a carrier frequency to the population of tags 120. Readers 104a and 104b typically operate in one or more of the frequency bands allotted for this type of RF communication. For example, frequency bands of 902-928 MHz and 2400-2483.5 MHz have been defined for certain RFID applications by the United States Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternately absorbing and reflecting signal 110 is referred to herein as backscatter modulation. Readers 104a and 104b receive and obtain data from response signals 112, such as an identification number of the responding tag 102. In the embodiments described herein, a reader may be capable of communicating with tags 102 according to any suitable communication protocol, including Class 0, Class 1, Electronic Product Code (EPC) Gen 2, other binary traversal protocols and slotted aloha protocols, any other protocols mentioned elsewhere herein, and future communication protocols.

Figure 2:
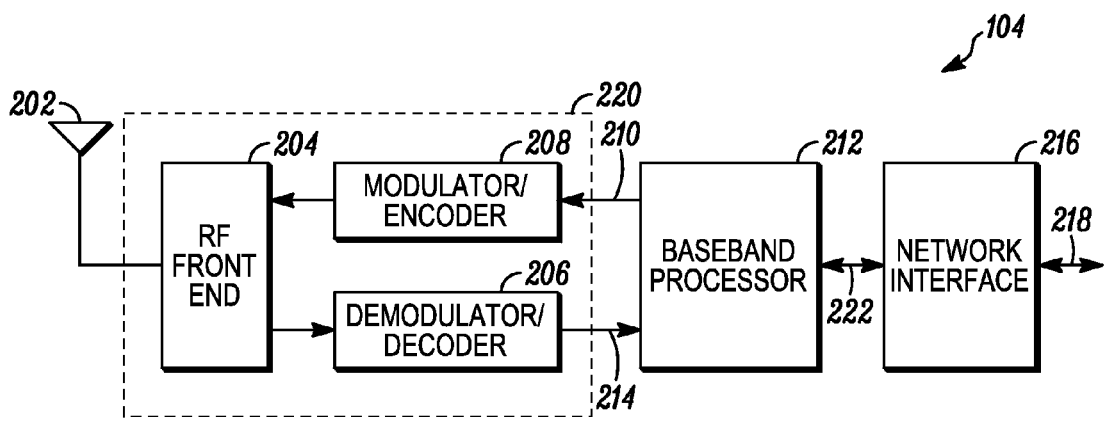
FIG. 2 is a block diagram illustrating some elements of an RFID reader device, according to an embodiment of the present invention.

FIG. 2 is a block diagram of an example RFID reader 104. Reader 104 includes an antenna 202, a receiver and transmitter portion 220 (also referred to as transceiver 220), a baseband processor 212, and a network interface 216. These components of reader 104 may include software, hardware, and/or firmware, or any combination thereof, for performing their functions.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104. The processor 212 also processes computer readable program code components stored in a memory (not shown) of the reader 104 to implement various methods and functions of the reader 104 as described herein.

In an embodiment, reader 104 includes network interface 216 to interface reader 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver portion 220 transmits the interrogation request via antenna 202.

Reader 104 includes antenna 202 for communicating with tags 102 and/or other readers 104. The antenna 202 may be any type of reader antenna known to persons skilled in the relevant art, including a vertical, dipole, loop, Yagi-Uda, slot, or patch antenna type. For description of an example antenna suitable for reader 104, refer to U.S. Pat. No. 7,551,140, titled "Low Return Loss Rugged RFID Antenna," issued 23 Jun. 2009, which is incorporated by reference herein in its entirety.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In some embodiments, network interface 216 enables a wired and/or wireless connection with communications network 218. For example, network interface 216 may enable a wireless local area network (WLAN) link (including an Institute of Electrical and Electronics Engineers (IEEE) 802.11 WLAN standard link), a BLUETOOTH (Registered Trademark) link, and/or other types of wireless communication links. Communications network 218 may be a local area network (LAN), a wide area network (WAN) (e.g. the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. An example description of these components is provided as follows.

Modulator/encoder 208 receives interrogation request 210, and is coupled to an input of RF front-end 204. Modulator/encoder 208 encodes interrogation request 210 into a signal format, modulates the encoded signal, and outputs the modulated encoded interrogation signal to RF front-end 204. For example, pulse-interval encoding (PIE) may be used in a Gen 2 embodiment. Furthermore, double sideband amplitude shift keying (DSB-ASK), single sideband amplitude shift keying (SSB-ASK), or phase-reversal amplitude shift keying (PR-ASK) modulation schemes may be used in a Gen 2 embodiment. Note that in an embodiment, baseband processor 212 may alternatively perform the encoding function of modulator/encoder 208.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214.

Note that in an embodiment, baseband processor 212 may alternatively perform the decoding function of demodulator/decoder 206.

The configuration of transceiver 220 shown in FIG. 2 is provided for purposes of illustration, and is not intended to be limiting. Transceiver 220 may be configured in numerous ways to modulate, transmit, receive, and demodulate RFID communication signals, as is known to persons skilled in the relevant art(s).

Figure 3:
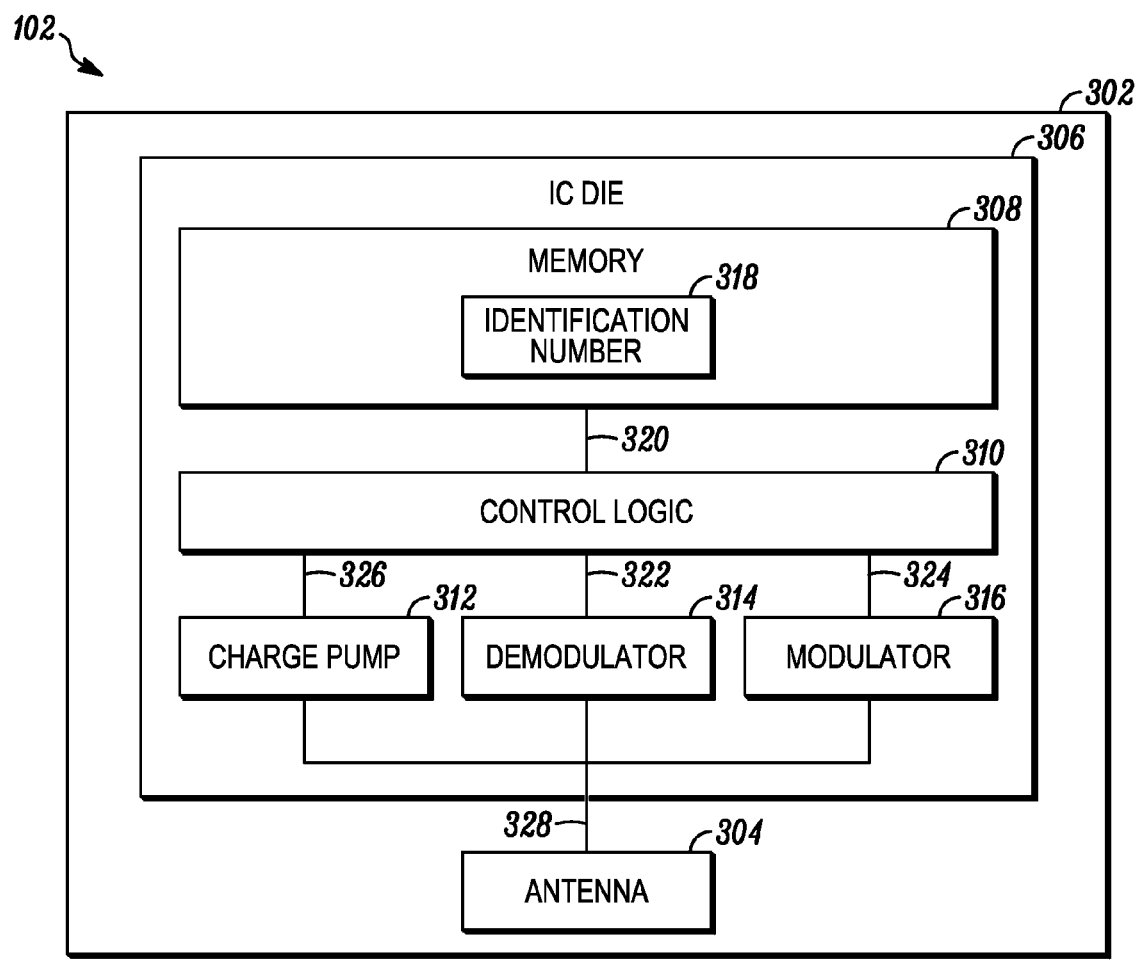
FIG. 3 is a block diagram illustrating some elements of an RFID tag, according to an embodiment of the present invention.

The present invention is applicable to any type of RFID tag. FIG. 3 shows a block diagram of a RFID tag 102. Tag 102 includes a substrate 302, an antenna 304, and an integrated circuit (IC) 306. Antenna 304 is formed on a surface of substrate 302. Antenna 304 may include any number of one, two, or more separate antennas of any suitable antenna type, including, but not limited to, dipole, loop, slot, or patch antenna type. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID readers using antenna 304. In the example embodiment of FIG. 3, IC 306 includes a memory 308, a control logic 310, a charge pump 312, a demodulator 314, and a modulator 316. An input of charge pump 312, an input of demodulator 314, and an output of modulator 316 are coupled to antenna 304 by antenna signal 328. Note that in the present disclosure, the terms "lead" and "signal" may be used interchangeably to denote the connection between elements or the signal flowing on that connection.

Memory 308 is typically a non-volatile memory, but can alternatively be a volatile memory, such as a dynamic random access memory (DRAM). Memory 308 stores data, including identification number 318. Identification number 318 typically is a unique identifier (at least in a local environment) for tag 102. For instance, when tag 102 is interrogated by a reader (e.g. receives interrogation signal 110 shown in FIG. 1), tag 102 may respond with identification number 318 to identify itself Identification number 318 may be used by a computer system to associate tag 102 with its particular associated object/item.

Demodulator 314 is coupled to antenna 304 by antenna signal 328. Demodulator 314 demodulates a RF communication signal (e.g. interrogation signal 110) on antenna signal 328 received from a reader by antenna 304. Control logic 310 receives demodulated data of the RF communication signal from demodulator 314 on input signal 322. Control logic 310 controls the operation of RFID tag 102 based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to a reader interrogation. Control logic 310 outputs data to be transmitted to a reader (e.g. response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g. one or more bits of identification number 318) onto a RF signal (e.g. a carrier signal transmitted by reader 104) received via antenna 304. The modulated RF signal is response signal 112, which is received by reader 104. In an embodiment, modulator 316 includes a switch, such as a single pole, single throw (SPST) switch. The switch changes the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art. Modulator 316 and demodulator 314 may be referred to collectively as a "transceiver" of tag 102.

Charge pump 312 is coupled to antenna 304 by antenna signal 328. Charge pump 312 receives a RF communication signal (e.g. a carrier signal transmitted by reader 104) from antenna 304, and generates a direct current (DC) voltage level that is output on a tag power signal 326. Tag power signal 326 is used to power circuits of IC die 306, including control logic 320.

In an embodiment, charge pump 312 rectifies the RF communication signal of antenna signal 328 to create a voltage level. Furthermore, charge pump 312 increases the created voltage level to a level sufficient to power circuits of IC die 306. Charge pump 312 may also include a regulator to stabilize the voltage of tag power signal 326. Charge pump 312 may be configured in any suitable way known to persons skilled in the relevant art. For description of an example charge pump applicable to tag 102, refer to U.S. Pat. No. 6,734,797, titled "Identification Tag Utilizing Charge Pumps for Voltage Supply Generation and Data Recovery," which is incorporated by reference herein in its entirety. Alternative circuits for generating power in a tag are also applicable to embodiments of the present invention.

It will be recognized by persons skilled in the relevant art(s) that tag 102 may include any number of modulators, demodulators, charge pumps, and antennas. Tag 102 may additionally include further elements, including an impedance matching network and/or other circuitry. Embodiments of the present invention may be implemented in tag 102, and in other types of tags.

Embodiments described herein are applicable to all forms of tags, including tag "inlays" and "labels." A "tag inlay" or "inlay" is defined as an assembled RFID device that generally includes an integrated circuit chip (and/or other electronic circuit) and antenna formed on a substrate, and is configured to respond to interrogations. A "tag label" or "label" is generally defined as an inlay that has been attached to a pressure sensitive adhesive (PSA) construction, or has been laminated, and cut and stacked for application. One form of a "tag" is a tag inlay that has been attached to another surface, or between surfaces, such as paper, cardboard, etc., for attachment to an object to be tracked, such as an article of clothing, etc.

Example embodiments of the present invention are described in further detail below. Such embodiments may be implemented in the environments, readers, and tags described above, and/or in alternative environments and alternative RFID devices.

Figure 4:
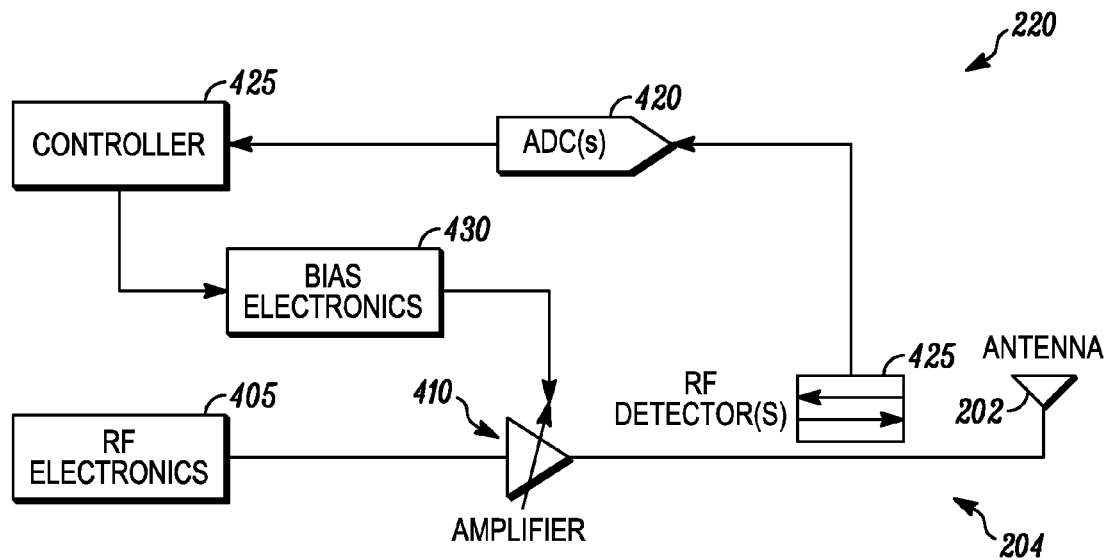
FIG. 4 is a circuit diagram illustrating further elements of a transceiver of an RFID reader device, according to an embodiment of the present invention.

FIG. 4 is a circuit diagram illustrating further elements of the transceiver 220 of the RFID reader device 104, according to an embodiment of the present invention. As will be understood by those having ordinary skill in the art, various elements of the modulator/encoder 208 and the RF front-end 204 comprise a generator for generating a CW carrier signal at the RFID reader device 104. For example, RF electronics 405 produce a carrier wave that provides a driver signal to a power amplifier (PA) 410. During a tag to reader backscatter signaling stage, the PA 410 outputs a CW carrier signal as an interrogation signal, which is transmitted from the antenna 202 to provide power to the tags 102.

However, any impedance mismatch concerning the antenna 202 can cause a reflected signal to reflect back from the antenna 202. As known by those having ordinary skill in the art, such a reflected signal also can be caused by cabling or an RF-reflective object positioned in front of the antenna 202.

A reflected signal from the antenna 202 can be measured by estimating a return loss value of the antenna 202. For example, a return loss value can be estimated by comparing at least one parameter of the interrogation signal and at least one parameter of the reflected signal. As will be understood by those having ordinary skill in the art, the ratio of an amplitude V, of a reflected wave to an amplitude $V_i$ of an incident wave is known as a reflection coefficient $\Gamma$:

$$\Gamma = \frac{V_r}{V_i} \quad \text{(Eq. 1)}$$

A return loss value can be defined, for example, simply as a magnitude of the reflection coefficient in decibels (dB). Thus, a return loss (RL) value can be expressed as:

$$RL(dB) = -20 \log_{10} |\Gamma| \quad \text{(Eq. 2)}$$

A large positive return loss thus indicates that reflected power from the antenna 202 is small relative to the incident power output from the PA 410, which indicates a good impedance match from source to load. By measuring the actual transmitted (incident) power from the PA 410 and the reflected power from the antenna 202, the return loss value in dB can be calculated as the difference between the incident power $P_i$ (in dBm) and the reflected power $P_r$ (in dBm):

$$RL(dB) = P_i(dBm) - P_r(dBm) \quad \text{(Eq. 3)}$$

Increasing the operating point of the PA 410 of the reader device 104 will generally increase its return loss value and increase an operating range of the amplifier. However, embodiments of the present invention do not rigidly force the PA 410 into an operating state that is stable in worst case return loss situations; rather, the operating point of the PA 410 is adjusted in real time in response to a measured return loss value. Thus, in situations where the return loss is relatively high, the operating point of the PA 410 can be decreased. Thus, power for the reader device 104 can be conserved and the overall efficiency of the reader device 104 can be improved.

For example, the reflected power, $P_r$, can be measured by sampling a reflected signal from the antenna 202 using a backward direction of a directional coupler RF detector 415. The reflected signal is then processed through an analog to digital converter (ADC) 420 and input to a controller 425. The controller 425 then compares the incident power, P from the PA 410 with the reflected power, $P_r$, from the antenna 202 to estimate a return loss value. If an adjustment of the operating point of the PA 410 is required, the controller 425 transmits a control signal to bias electronics 430 to adjust the operating point of the PA 410.

Figure 5:
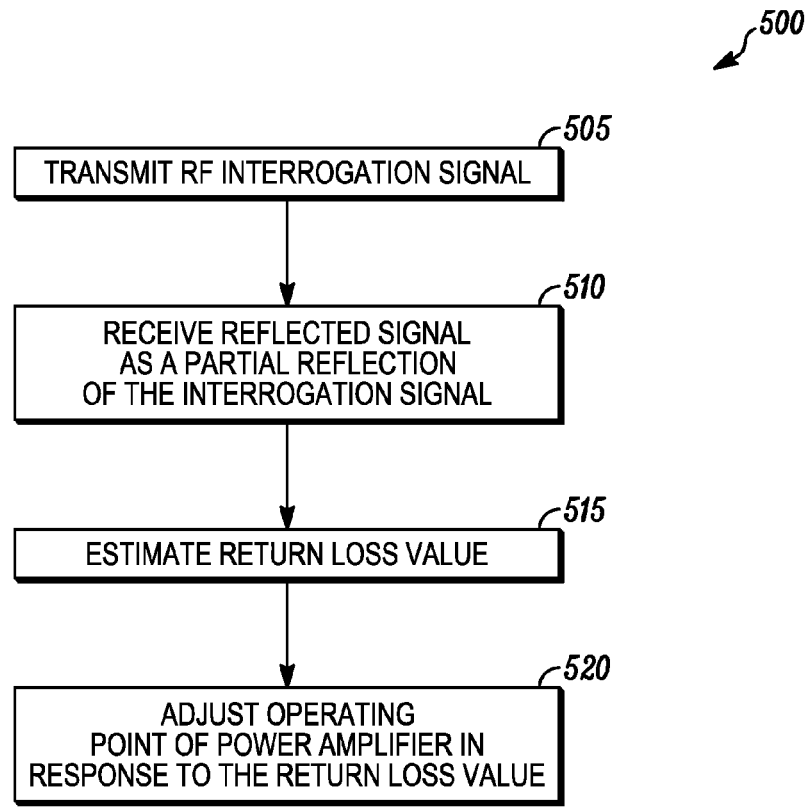
FIG. 5 is a flow diagram illustrating a method for adaptive operation of a power amplifier of an RFID reader device, according to some embodiments of the present invention.

FIG. 5 is a flow diagram illustrating a method for adaptive operation of the power amplifier 410 of the RFID reader device 104, according to some embodiments of the present invention. At step 505, an RF interrogation signal is transmitted from the antenna 202 of the RFID reader device 104. At step 510, a reflected signal is received as a partial reflection of the interrogation signal. At step 515, a return loss value is estimated by comparing at least one parameter of the interrogation signal and at least one parameter of the reflected signal. Finally, at step 520, an operating point of the PA 410 is adjusted in response to the return loss value.

Advantages of some embodiments of the present invention therefore include enabling an RFID reader device to adjust in real time the operating point of an RF power amplifier of the device to improve both the overall stability and energy efficiency of the device. In the presence of a high return loss value, and thus effective antenna impedance matching, the operating point can be decreased in real time to reduce energy consumption while still providing undistorted modulated transmissions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", or "contains a . . . " does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g. comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for adaptive operation of a power amplifier of a radio frequency identification (RFID) reader device, the method comprising:
    producing a carrier wave from the power amplifier to an antenna for transmitting to an RFID tag;
    receiving a reflected signal back from the antenna as a partial reflection of the carrier wave;
    estimating a return loss value of the reflected signal by comparing a signal power of the carrier wave and a signal power of the reflected signal; and
    adjusting an operating bias point of the power amplifier in response to the return loss value.

2. The method of claim 1, wherein the operating bias point is increased in response to a low return loss value.

3. The method of claim 1, wherein the operating bias point is decreased in response to a high return loss value.

4. The method of claim 1, wherein the RFID reader device is battery operated.

5. The method of claim 1, wherein the reflected signal is created by an impedance mismatch concerning the antenna of the RFID reader device.

6. The method of claim 1, wherein adjusting the operating bias point of the power amplifier is performed in real time during operation of the RFID reader device.

7. The method of claim 1, wherein the carrier wave and the reflected signal are sampled by a directional coupler.

8. A system for adaptive operation of a power amplifier of a radio frequency identification (RFID) reader device, the system comprising:
    a radio frequency (RF) front end comprising the power amplifier for producing a carrier wave to an antenna for transmitting to an RFID tag;
    an RF detector coupled to the RF front end for receiving a reflected signal back from the antenna as a partial reflection of the carrier wave;
    a controller coupled to the RF detector for estimating a return loss value of the reflected signal by comparing a signal power of the carrier wave and a signal power of the reflected signal; and
    bias electronics coupled to the controller for adjusting an operating bias point of the power amplifier in response to the return loss value.

9. The system of claim 8, wherein the operating bias point is increased in response to a low return loss value.

10. The system of claim 8, wherein the operating bias point is decreased in response to a high return loss value.

11. The system of claim 8, wherein the RFID reader device is battery operated.

12. The system of claim 8, wherein the reflected signal is created by an impedance mismatch concerning the antenna of the RFID reader device.

13. The system of claim 8, wherein adjusting the operating bias point of the power amplifier is performed in real time during operation of the RFID reader device.

14. The system of claim 8, wherein the carrier wave and the reflected signal are sampled by a directional coupler.

* * * * *